US011952959B2

(12) United States Patent
Maimone et al.

(10) Patent No.: US 11,952,959 B2
(45) Date of Patent: Apr. 9, 2024

(54) INTERCHANGEABLE COMBUSTION ENGINE

(71) Applicant: Exotic Sports Products, Inc., North Lima, OH (US)

(72) Inventors: Bud A. Maimone, North Lima, OH (US); Brent Anthony Maimone, North Lima, OH (US)

(73) Assignee: Exotic Sports Products, Inc., North Lima, OH (US)

( * ) Notice: Subject to any disclaimer, the term of this patent is extended or adjusted under 35 U.S.C. 154(b) by 0 days.

(21) Appl. No.: 17/848,141

(22) Filed: Jun. 23, 2022

(65) Prior Publication Data

US 2022/0412286 A1 Dec. 29, 2022

Related U.S. Application Data

(60) Provisional application No. 63/215,324, filed on Jun. 25, 2021.

(51) Int. Cl.
*F02F 7/00* (2006.01)

(52) U.S. Cl.
CPC .......... *F02F 7/0082* (2013.01); *F02F 7/0031* (2013.01); *F02F 2007/0041* (2013.01)

(58) Field of Classification Search
CPC ...... F02F 7/0082; F02F 7/0031; F02F 7/0036; F02F 2007/0041

(Continued)

(56) References Cited

U.S. PATENT DOCUMENTS 5,615,650 A * 4/1997 Araki ...................... F02B 75/16 123/65 R
2005/0166395 A1* 8/2005 Millerman ............ F02F 7/0031 29/446

(Continued)

FOREIGN PATENT DOCUMENTS

CN 205779284 12/2016
DE 19633176 2/1998
DE 19633176 A1 * 2/1998 .............. F02B 69/00

OTHER PUBLICATIONS

PCT Search Report and Written Opinion for Application No. PCT/US2022/034858, dated Jun. 22, 2022, 36 pages.

*Primary Examiner* — Lindsay M Low
*Assistant Examiner* — Omar Morales
(74) *Attorney, Agent, or Firm* — Knobbe Martens Olson and Bear, LLP

(57) ABSTRACT

Systems and methods for combustion engines with interchangeable components are described herein. An engine sub-assembly for a gasoline powered engine can include a crankcase having an opening extending at least through an upper surface thereof, the opening being configured to receive a crank arm therethrough, and a first mounting plate configured to be coupled with the crankcase. The first mounting plate can be selectively removable from the crankcase. The opening of the first mounting plate can generally align with the opening in the crankcase when the first mounting plate is coupled with the crankcase. The first mounting plate can be configured to receive a first cylinder block and to couple the first cylinder block to the crankcase. A second mounting plate can be configured to couple with a second cylinder block that is different than the first cylinder block and to couple the second cylinder block to the crankcase.

17 Claims, 14 Drawing Sheets

(58) Field of Classification Search
USPC ........................................................ 123/195 R
See application file for complete search history.

(56) References Cited

U.S. PATENT DOCUMENTS

| | | | | |
|---|---|---|---|---|
| 2011/0120434 | A1* | 5/2011 | Wilson | F02M 25/00 123/575 |
| 2015/0013634 | A1* | 1/2015 | Schenkel | F02B 63/02 123/195 R |
| 2017/0101930 | A1* | 4/2017 | Meldolesi | F02F 7/0019 |

* cited by examiner

INTERCHANGEABLE COMBUSTION ENGINE

INCORPORATION BY REFERENCE TO ANY PRIORITY APPLICATIONS

The present application claims the benefit under 35 U.S.C. § 119(e) to U.S. Patent Application No. 63/215,324, filed on Jun. 25, 2021, the contents of which is incorporated by reference herein in its entirety as if fully set forth herein for all purposes. Any and all applications for which a foreign or domestic priority claim is identified in the Application Data Sheet as filed with the present application are hereby incorporated by reference herein in their entirety and made a part of this specification.

FIELD OF THE DISCLOSURE

Embodiments of the present disclosure relate to combustion engines, in particular, combustion engines configured to allow interchangeability of different cylinder blocks on a common crankcase, and methods for making and assembling same.

BACKGROUND

Combustion engine assemblies are conventionally designed such that a crankcase is configured to work with a particular cylinder block. This limits the possibilities for any interchangeability of different cylinder blocks or different orientations of cylinder blocks with a particular crankcase. Additionally, in some cases, when modifications are made to a crank arm that affect the length of the crank arm, spacers, risers, and other parts must be used to adjust a position of the cylinder block relative to the crank case.

SUMMARY

The embodiments disclosed herein each have several aspects no single one of which is solely responsible for the disclosure's desirable attributes. Without limiting the scope of this disclosure, example embodiments of some of the features will now be briefly discussed. After considering this discussion, and particularly after reading the Detailed Description, the skilled artisan will understand how the features of the embodiments described herein provide advantages over existing combustion engine systems and methods for customizing and manufacturing the same.

Disclosed herein are embodiments of an engine subassembly for a gasoline powered engine. In some embodiments, an engine subassembly can include a crankcase having an opening extending at least through an upper surface thereof, the opening being configured to receive a crank arm therethrough in an operable state, and a first mounting plate configured to be coupled with the crankcase, the first mounting plate having an opening therethrough.

Any embodiments of the of the engine sub-assembly can include, in additional embodiments, one or more of the following features, components, and/or details, in any combination with any of the other features, components, and/or details of any other embodiments described herein: wherein the first mounting plate is selectively removable from the crankcase, the opening of the first mounting plate generally aligns with the opening in the crankcase when the first mounting plate is coupled with the crankcase in an operable state, and the first mounting plate is configured to receive a first cylinder block and to couple the first cylinder block to the crankcase in at least a first orientation, wherein the first mounting plate has a first set of mounting holes and a second set of mounting holes, wherein the first set of mounting holes of the first mounting plate are configured to align with a set of mounting holes of the crankcase so that a first set of fasteners can advance through the first set of mounting holes of the first mounting plate and the set of mounting holes of the crankcase to couple the first mounting plate to the crankcase and the second set of mounting holes of the first mounting plate are configured to align with a set of mounting holes of a first cylinder block so that a second set of fasteners can advance through the second set of mounting holes of the first mounting plate and the set of mounting holes of the first cylinder block to couple the cylinder block to the first mounting plate, wherein the first set of mounting holes of the crankcase have internal threads, and/or wherein the sub-assembly includes a second mounting plate that is different than the first mounting plate, wherein: the crankcase is configured to selectively receive the second mounting plate in place of the first mounting plate so that the second mounting plate is coupled with the crankcase, the second mounting plate is selectively removable from the crankcase, the second mounting plate has an opening therethrough that aligns with the opening of the crankcase when the second mounting plate is operably coupled with the crankcase, and the second mounting plate is configured to couple a second cylinder block that is different than the first cylinder block to the crankcase.

Any embodiments of the of the engine sub-assembly can include, in additional embodiments, one or more of the following features, components, and/or details, in any combination with any of the other features, components, and/or details of any other embodiments described herein: wherein T the second mounting plate is different than the first mounting plate, wherein the second mounting plate is configured to receive a second cylinder block and to couple the second cylinder block to the crankcase, wherein the second cylinder block has a different shape and/or size as compared to the first cylinder block, wherein the second mounting plate has a first set of mounting holes that are configured to align with the first set of mounting holes of the crankcase, wherein the second mounting plate has a second set of mounting holes that are configured to align with the set of mounting holes of the first cylinder block so as to couple the first cylinder block to the crankcase in a second orientation, the second orientation being different than the first orientation, wherein the second orientation is 180° rotated from the first orientation, wherein the second mounting plate has a second set of mounting holes that are configured to align with a set of mounting holes of a second cylinder block to couple a second cylinder block to the crankcase, wherein the second cylinder block is different than the first cylinder block, where the sub-assembly can include a first cylinder block, wherein the first cylinder block comprises a piston, wherein the crankcase has a recess adjacent to the opening of the crankcase, the recess being configured to receive the first mounting plate at least partially therein, wherein the crankcase has a first locking feature configured to couple with a first locking feature of the first mounting plate, wherein the crankcase has a groove formed therein, the groove being configured to receive a tongue portion of the first mounting plate, and/or wherein the recess has a groove and the first mounting plate has a tongue configured to complement a shape of the groove and to couple with the groove to secure at least a portion of the first mounting plate to the recess.

Any embodiments of the of the engine sub-assembly can include, in additional embodiments, one or more of the following features, components, and/or details, in any combination with any of the other features, components, and/or details of any other embodiments described herein: wherein the engine assembly is a single cylinder engine, wherein the engine assembly is a two stroke engine assembly, wherein the engine assembly is a four stroke engine assembly, wherein the sub-assembly can include a third mounting plate, wherein the crankcase is configured to selectively receive the third mounting plate in place of the first mounting plate so that the third mounting plate is coupled with the crankcase, the third mounting plate is selectively removable from the crankcase, the third mounting plate has an opening therethrough that aligns with the opening of the crankcase when the third mounting plate is operably coupled with the crankcase, and the third mounting plate is different than the first mounting plate and the second mounting plate, wherein the third mounting plate is configured to receive a third cylinder block and to couple the third cylinder block to the crankcase, wherein the third cylinder block has a different shape and/or size as compared to the first cylinder block and the second cylinder block, wherein the third mounting plate has a first set of mounting holes that are configured to align with the first set of mounting holes of the crankcase, and/or wherein the engine assembly can be used to power an aircraft, a car, a truck, a go kart, a golf cart, a scooter, a motorcycle, a lawn mower, and/or any other desired vehicle.

Also disclosed herein are embodiments of an engine assembly for a gasoline powered engine. In some embodiments, an engine assembly for a gasoline powered engine can include a crankcase having an opening extending at least through an upper surface thereof, the opening being configured to receive a crank arm therethrough in an operable state, and a first mounting plate configured to be selectively coupled with the crankcase, the first mounting plate having an opening therethrough, and a second mounting plate configured to be selectively coupled with the crankcase, the second mounting plate having an opening therethrough, wherein when the first mounting plate is coupled with the crankcase in an operable state, the opening of the first mounting plate generally aligns with the opening in the crankcase, the first mounting plate is configured to receive a first cylinder block and to couple the first cylinder block to the crankcase, when the second mounting plate is coupled with the crankcase in an operable state, the opening of the second mounting plate generally aligns with the opening in the crankcase, the second mounting plate is configured to receive a second cylinder block and to couple the second cylinder block to the crankcase, and the second cylinder block has a different shape and/or size than the first cylinder block.

Also disclosed herein are embodiments of an engine assembly for a gasoline powered engine. In some embodiments, an engine assembly for a gasoline powered engine can include a crankcase that can include an opening extending at least through an upper surface thereof, the opening being configured to receive a crank arm therethrough in an operable state, and a recess for receiving a first mounting plate, and a first mounting plate configured to be coupled with the crankcase, the first mounting plate having an opening therethrough, wherein the first mounting plate is selectively removable from the crankcase, the opening of the first mounting plate generally aligns with the opening in the crankcase when the first mounting plate is coupled with the crankcase in an operate state, and the first mounting plate is configured to receive a first cylinder block and to couple the first cylinder block to the crankcase in a first orientation.

Also disclosed herein are embodiments of a mounting plate. In some embodiments, a mounting plate can include a first set of mounting holes extending through the mounting plate, a second set of mounting holes extending through the mounting plate, and a sealing boss.

Any embodiments of the mounting plate can include, in additional embodiments, one or more of the following features, components, and/or details, in any combination with any of the other features, components, and/or details of any other embodiments described herein: wherein the mounting plate is configured to couple to a crankcase via the first set of mounting holes, the mounting plate is configured to couple to a cylinder block via the second set of mounting holes, and the sealing boss is configured to receive an o-ring and to seal against a surface of the crankcase, where the mounting plate further can include a third set of mounting holes extending a distance downward from a top surface of the mounting plate, wherein the third set of mounting holes is configured to secure a girdle strap, wherein the girdle strap is configured with a plurality of mounting holes for attaching the girdle strap to the mounting plate and to the crankcase, where the mounting plate further can include one or more oil holes for transporting oil to the crankcase wherein the one or more oil holes are at an angle with respect to an axis that is perpendicular to a bottom surface of the mounting plate, and wherein the angle is from about 5° to about 15°, wherein the mounting plate further can include at least one angled portion on at least one side of the mounting plate, the at least one angled portion configured to align with an angled portion of the crankcase, wherein the first set of mounting holes can include a first portion adjacent to a top surface of the mounting plate and at a first angle with respect the top surface of the mounting plate, and a second portion adjacent to the first portion and at a second angle with respect to the top surface of the mounting plate, wherein the first angle is less than the second angle, wherein the first angle is from about 5° to about 20°, and wherein the second angle is from about 30° to about 70°, wherein each hole of the first set of mounting holes comprises an undercut for receiving a bearing, wherein each hole of the second set of mounting holes comprises a head portion for receiving a head of a fastener, wherein the head portion is shaped to prevent rotation of the fastener, wherein each hole of the second set of mounting holes is configured to receive a portion of a hollow dowel, wherein a second portion of the hollow dowel is received by a mounting hole of a cylinder block, and/or wherein the hollow dowel aligns the mounting plate and the cylinder block.

Also disclosed herein are embodiments of a crankcase. In some embodiments, a crank case can include an opening extending at least through an upper surface thereof, the opening being configured to receive a crank arm therethrough in an operable state, and a recess for receiving a first mounting plate.

Any embodiments of the crankcase can include, in additional embodiments, one or more of the following features, components, and/or details, in any combination with any of the other features, components, and/or details of any other embodiments described herein: wherein the crankcase can include a first set of mounting holes, the first set of mounting holes configured for coupling a mounting plate to the crankcase, wherein the crankcase can further include at least one tapered interlock having a tapered segment, wherein the tapered segment extends from a bottom of the recess to a top surface of the crankcase, wherein the recess has a first height, and wherein the tapered segment has a second height that is less than the first height, and/or wherein the crankcase can further include a horizontal segment and a vertical segment.

Also disclosed herein are embodiments of a method of mounting a cylinder block to a crankcase. In some embodiments, mounting the method can include mounting a first mounting plate to the crankcase, and mounting a first cylinder block to the mounting plate.

Any embodiments of the method can include, in additional embodiments, one or more of the following features, components, and/or details, in any combination with any of the other features, components, and/or details of any other embodiments described herein: wherein the method further can include removing the first cylinder block from the first mounting plate, and mounting a second cylinder block to the first mounting plate, wherein the second cylinder block is different from the first cylinder block, wherein the method further can include removing the first cylinder block from the first mounting plate, removing the first mounting plate from the crankcase, mounting a second mounting plate to the crankcase, wherein the second mounting plate is different from the first mounting plate, and mounting a second cylinder block to the second mounting plate, wherein the second cylinder block is different from the first cylinder block, and/or wherein the method further can include removing the first cylinder block from the first mounting plate, removing the first mounting plate from the crankcase, mounting a second mounting plate to the crankcase, wherein the second mounting plate is different from the first mounting plate, and mounting the first cylinder block to the second mounting plate.

Also disclosed herein are embodiments of a method of modifying the orientation of a cylinder block portion of a single cylinder or multi-cylinder engine substantially as hereinbefore described or shown in the accompanying drawings. In any embodiments, the engine can be a single cylinder engine, a two cylinder engine (e.g., opposing cylinders), a three cylinder engine, a four cylinder engine, or otherwise.

Also disclosed herein are embodiments of a single cylinder or multi-cylinder engine substantially as hereinbefore described or shown in the accompanying drawings.

Also disclosed herein are embodiments of a mounting plate for an engine assembly, the mounting plate being configured to removably couple with a crankcase and cylinder block assembly.

BRIEF DESCRIPTION OF THE DRAWINGS

The foregoing and other features of the present disclosure will become more fully apparent from the following description and appended claims, taken in conjunction with the accompanying drawings. understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, all of which are explicitly contemplated and make part of this disclosure.

DETAILED DESCRIPTION OF SOME EXEMPLIFYING EMBODIMENTS

Described herein are embodiments of novel configurable combustion engine assemblies and components thereof. Any embodiments of the engines disclosed herein can be two stroke, four stroke, diesel or other types of engines that work on other combustion principles and/or single or multiple cylinder engines. The engine size can be any desired displacement such as from 0 cc-1500 cc or more, including without limitation 25 cc, 50 cc, 60 cc-65 cc, 80 cc-85 cc, 125 cc, 250 cc, 450 cc, 500 cc, or otherwise. The engines of any embodiments disclosed herein can be used for go karts, golf carts, scooters, motorcycles, lawn mowers, aircraft, jet skis, snowmobiles, or any other vehicles, machinery, equipment, or otherwise.

In any embodiments disclosed herein, the engine assembly can be a single cylinder engine assembly. Further, the engine assembly can be a two stroke engine assembly (which can include a billet 250R two stroke engine) or a four stroke engine assembly. Further, the engine assembly can be used to power at least one of a go kart, a golf cart, a scooter, a motorcycle, a lawn mower, an aircraft, a jet ski, a snowmobile, or any other desired motorized vehicle, machinery (such as a generator), or otherwise. In any embodiments, the cylinder block can also have a piston, one or more valves, and other components commonly found in combustion engines. In any embodiments disclosed herein, the engine assembly can further include spacer/riser plates for stroked cranks or engines with long rod kits. Further, some embodiments of the engine assembly (or sub-assembly thereof) can include a mounting plate 104 and a custom cylinder configured to convert a four stroke engine (such as the engine from a Honda 450F) to a two stroke engine. In this configuration, some embodiments of the engine assembly (or sub-assembly thereof) can be configured to create a two-stroke motorcycle from a four-stroke motorcycle, the converted motorcycle having particular benefits relative to a comparable two-stroke motorcycle. Such benefits could include, without limitation, a large clutch basket and electric start.

Some embodiments of the components disclosed herein can accommodate a wide range of crankcases and cylinder blocks, enabling a manufacturer and/or end user to assemble a customized engine. In some embodiments of the engine assemblies described herein, cylinder orientation can be changed, for example to cause exhaust to come from the front, side or rear and intake to occur from the front, side, or rear. For example and without limitation, a typical motorcycle is configured with the engine exhaust toward the front of the motorcycle and the intake toward the rear of the motorcycle. However, on some motorized equipment and under some circumstances, it can be desirable to deviate from a usual configuration.

Figure 6A:
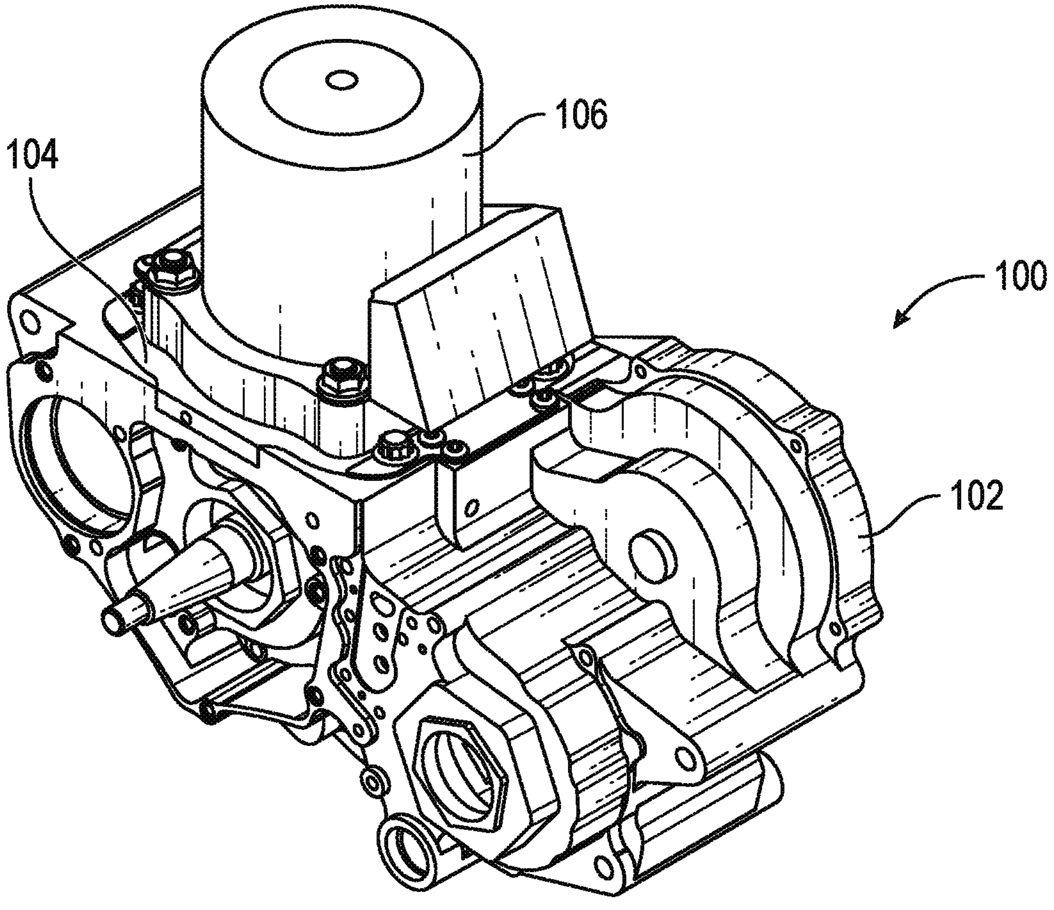
FIGS. 6A, 6B, and 6C show example engine assemblies that include an embodiment of a removable mounting plate.
Figure 6B:
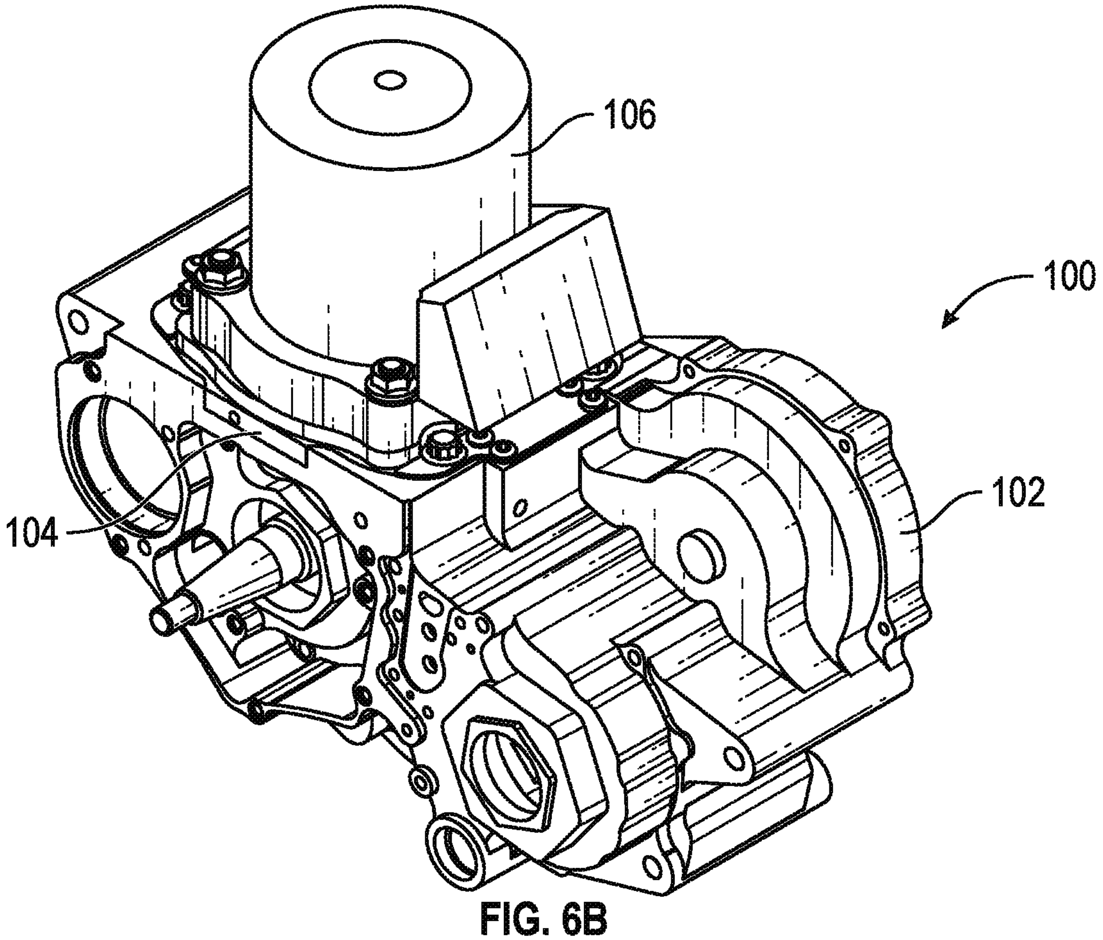
Figure 6C:
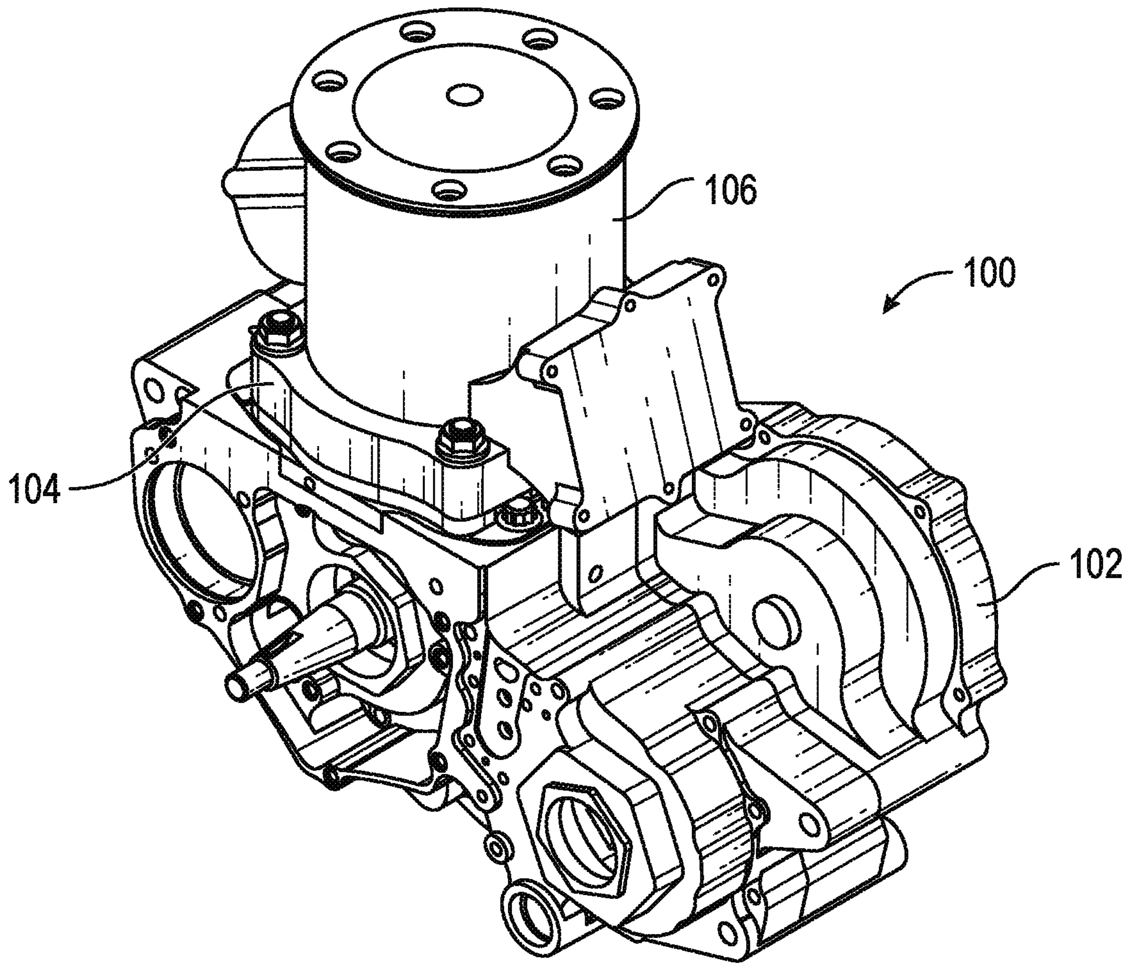

FIGS. 6A, 6B, and 6C show example engine assemblies that include an embodiment of a removable mounting plate 104. As shown in FIGS. 6A, 6B, and 6C, the mounting plate 104 can be part of an engine assembly 100 that includes a crankcase 102 and a cylinder block 106. Some features and/or components are shown schematically in FIGS. 6A-6C. As shown in FIGS. 6A-6C, the mounting plate 104 can have a variety of shapes to accommodate different crank cases 102 and cylinder blocks 106.

Figure 7:
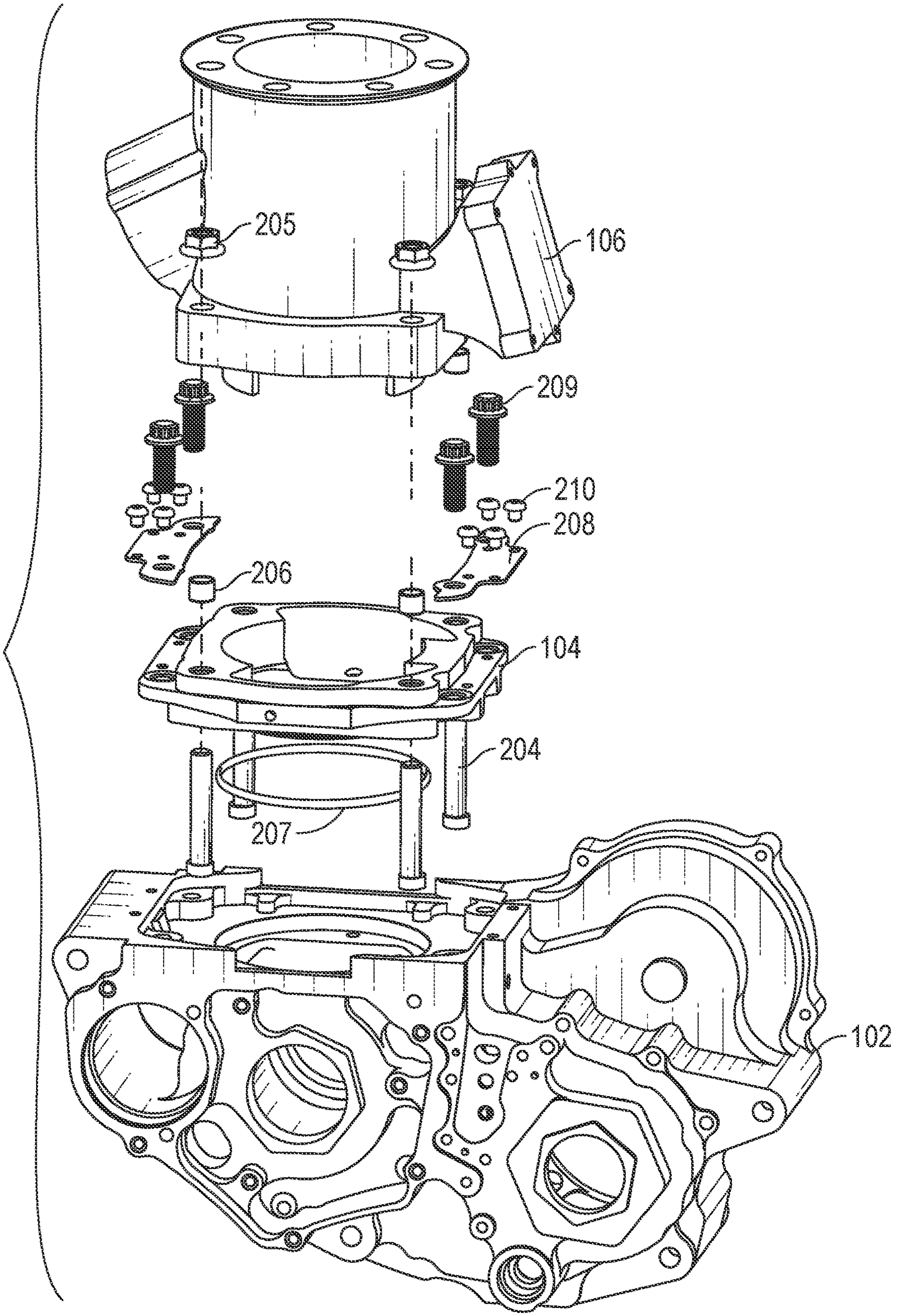
FIG. 7 shows an exploded view of an embodiment of a combustion engine assembly having an embodiment of a removal mounting plate.

FIG. 7 depicts an exploded view of an embodiment of an engine assembly. The engine assembly of FIG. 7 is configured to allow flexible configurations of crankcases and cylinders. An engine assembly can have a crankcase 102, a mounting plate 104, and a cylinder block 106, among other components and features shown or otherwise. The mounting plate 104 and cylinder block 106 can be mechanically coupled via the cam anchors 204 and cylinder nuts 205. In some embodiments, hollow dowels 206 can be inserted into holes of the mounting plate 104 and can extend into holes of the cylinder block 106. The hollow dowels 206 can aid in aligning the mounting plate 104 and the cylinder block 106. In some embodiments, an o-ring 207 can be used for forming a seal between the crankcase 102 and the mounting plate 104.

In some embodiments, hold down elements, for example and without limitation, straps 208 (also referred to herein as girdle straps) can be used to attach the mounting plate 104 to the crankcase 102. The straps 208 can have a plurality of holes for receiving shoulder bolts and/or anchor bolts. For example, each strap 208 can, in some embodiments, have two anchor bolt holes for anchoring the strap 208 to the crankcase 102 using anchor bolts 209. The girdle strap 208 can, in some embodiments, have four shoulder bolt holes for attaching the girdle strap 208 to the crankcase 101 and the mounting plate 104 using shoulder bolts 210. In some embodiments, the straps can also help stabilize and secure the mounting plate 104 and/or the cylinder 106 to the crankcase 102, reduce warping, vibration, and/or movement of the mounting plate 104 and/or the cylinder 106 relative to the crankcase 102.

In some embodiments, the engine assembly (or sub-assembly thereof) can be configured to be used in a gasoline powered vehicle and can include a crankcase 102 having an opening 103 extending at least through an upper surface of the crankcase 102 and a first mounting plate 104 configured to be selectively coupled with the crankcase 102. The mounting plate 104 can be positionable between the crankcase 102 of the engine 100 and a cylinder block portion 106 of the engine 100 so that the mounting plate 104 can form an interface between the crankcase 102 and any of a number of different cylinder blocks. The opening 103 of the crankcase 102 can be configured so that a crank arm can extend therethrough in an operable state (crank arm not shown), and the first mounting plate 104 can also have an opening 105 through which a crank arm can extend in an operable state. The opening 105 of the first mounting plate 104 can generally align with the opening 103 in the crankcase 102 when the first mounting plate 104 is coupled with the crankcase 102 in an operable state.

Figure 2:
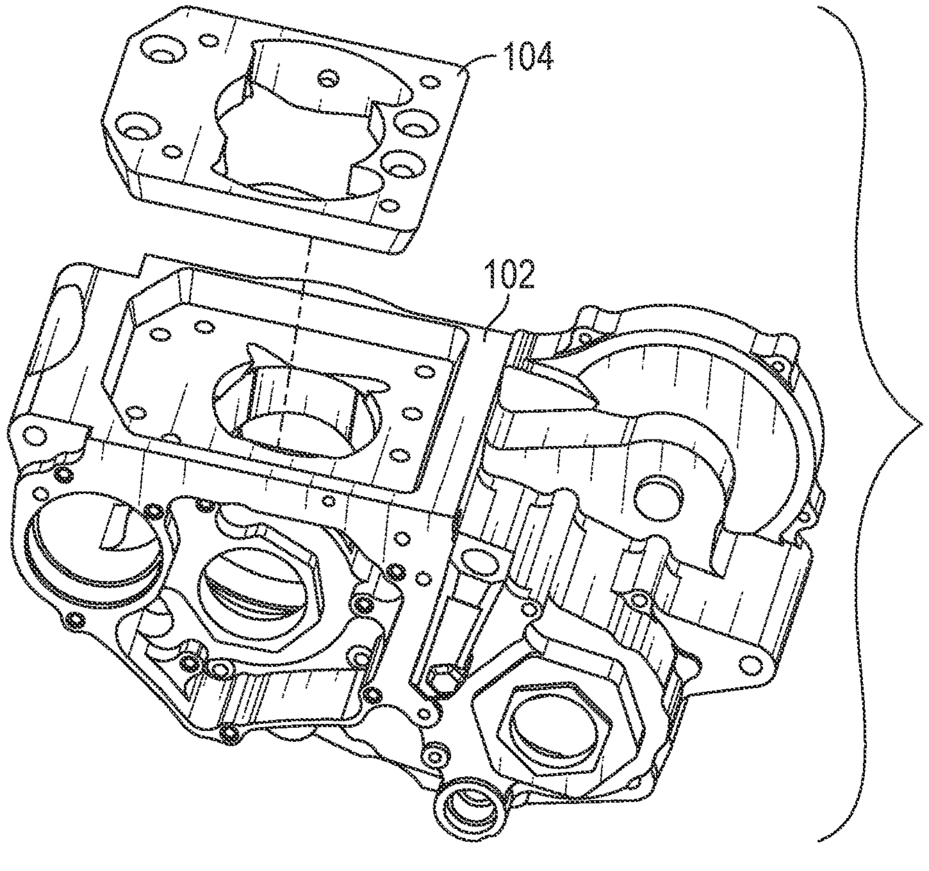
FIG. 2 is an exploded perspective view of a crankcase and mounting plate component of FIG. 1.

The first mounting plate 104 is configured to receive a first cylinder block 106 and to couple the first cylinder block 106 to the crankcase 102 in a first orientation. The first orientation of some embodiments is identified by arrow A1 in FIG. 3 which, can be, for example and without limitation, an orientation wherein an exhaust port or manifold of the cylinder block faces in the direction designated by arrow A1. In any embodiments disclosed herein, the crankcase 102 and the first mounting plate 104 can be configured such that the first mounting plate 104 can be selectively removable from the crankcase 102. This can allow the first mounting plate 104 to be interchangeable with another mounting plate of any other desired configuration, thereby permitting an unlimited range and number of different cylinder blocks of any desired size, type, manufacturer, or otherwise to be coupled with the crankcase and in any of a range of different orientations, or allow a cylinder block to be mounted to the crankcase 102 in any of a range of different orientations. For example, a mounting plate 104 can be configured so that a cylinder block can be coupled with the mounting plate and the crankcase 102 in a first orientation wherein the exhaust manifold of the cylinder block/top end 106 extends in a first direction relative to the mounting plate 104 and/or the bottom end 104 of the engine 100, or so that the cylinder block can be mounted in a second orientation wherein the exhaust manifold of the top end 106 extends in a second direction relative to the mounting plate 104 and/or the bottom end 102 of the engine 100, wherein the second direction is different than the first direction. In some embodiments, the second direction can be an opposing direction (i.e., 180° or approximately 180° rotated from the first direction). A nonlimiting example of the second direction of some embodiments is identified by arrow A2 in FIG. 2. In some embodiments, the second direction can be 90° or approximately 90° rotated in either direction from the first direction).

Figure 1:
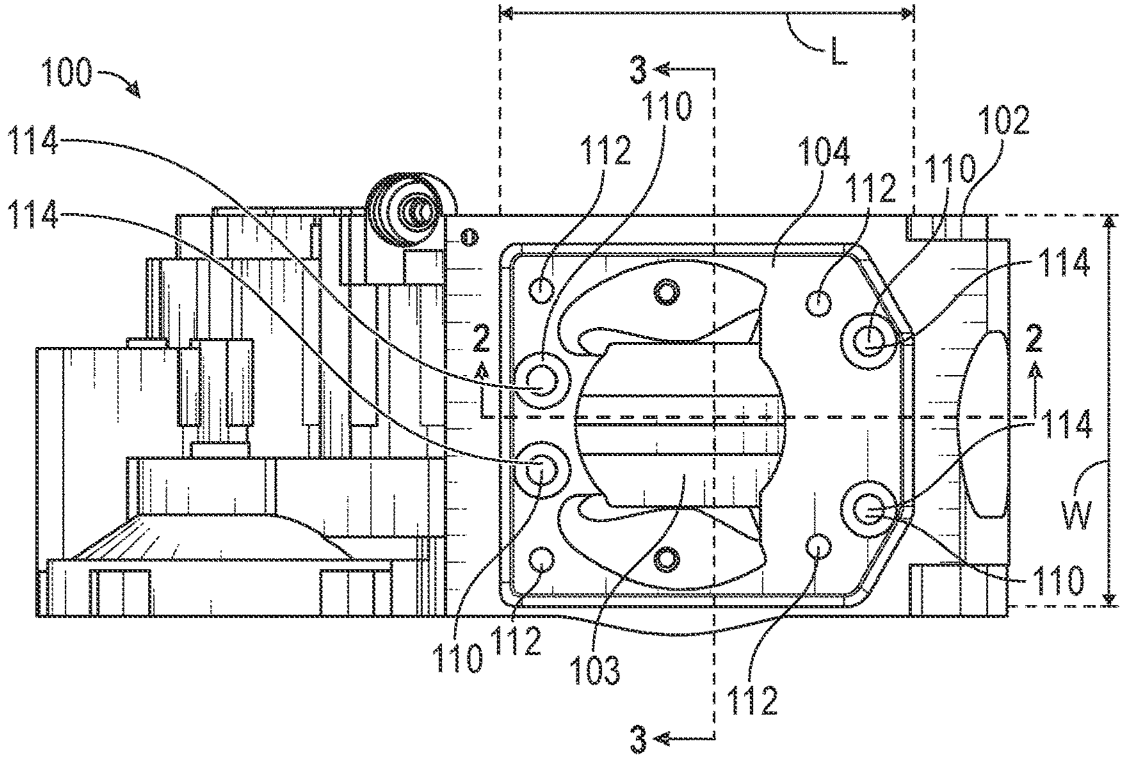
FIG. 1 shows a top view of an embodiment of a crankcase having a mounting plate component coupled with the crankcase.
Figure 4:
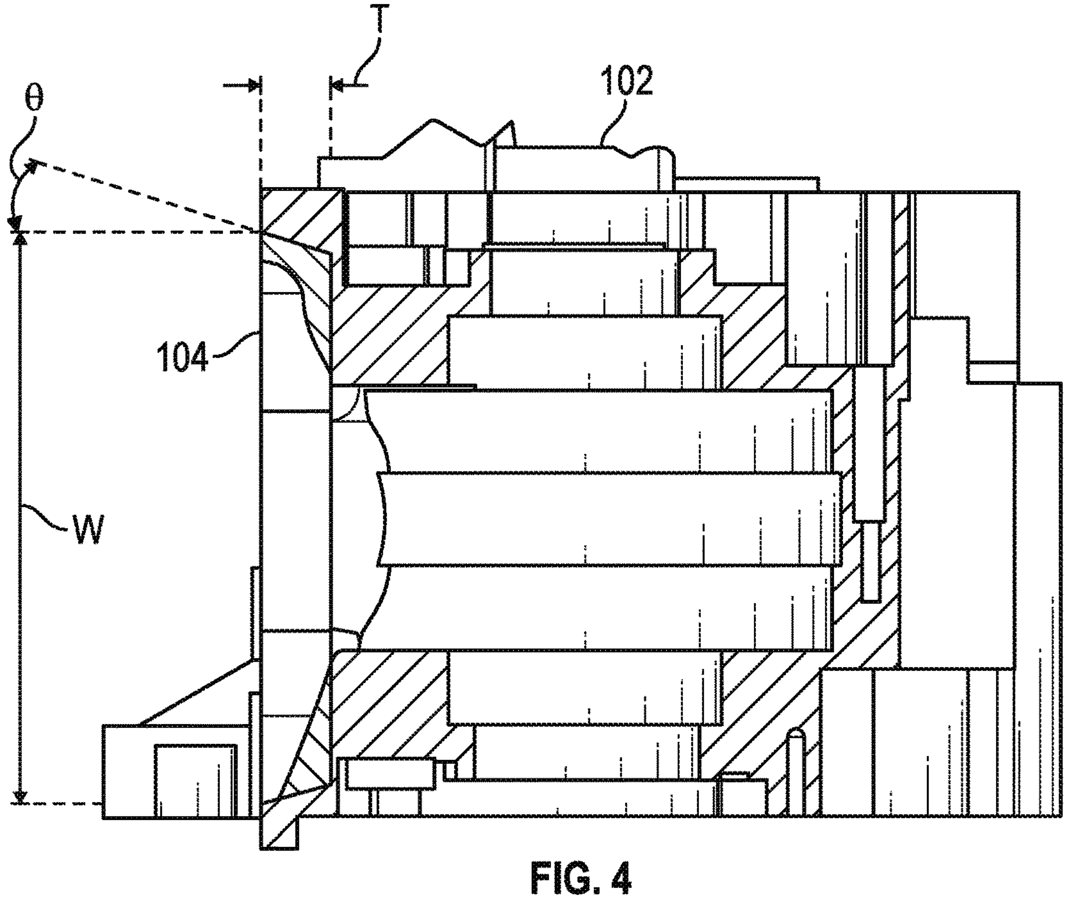
FIG. 4 shows a partial section view of the embodiment of the crankcase of FIG. 1 taken through section 3-3 shown in FIG. 1.

Some embodiments of the mounting plate 104 can have a wide range of dimensions, hole patterns, thicknesses, etc., to accommodate a wide range of crank cases and cylinder blocks. For example, the mounting plate 104 can have thickness T (as shown in FIG. 4), width W (as shown in FIGS. 1 and 4) and a length L (as shown in FIG. 1). The width W and length L can be the same or different, and can take on a range of values so as to accommodate a variety of crankcases and cylinder blocks. For example, the dimensions W and/or L can be 3 inches or about 3 inches, 4 inches or about 4 inches, 5 inches or about 5 inches, 6 inches or about 6 inches, 7 inches or about 7 inches, 8 inches or about 8 inches, 9 inches or about 9 inches, or from and to any numbers from the foregoing numbers, for example from 3 inches to 9 inches or from about 3 inches to about 9 inches. As shown in FIG. 4, the mounting plate 104 can have a thickness T. The thickness T can vary depending on the crankcase, the stroke length, connecting rod length, and other factors. The thickness T can be, for example, 0.4 inches or about 0.4 inches, 0.6 inches or about 0.6 inches, 0.8 inches or about 0.8 inches, 1 inches or about 1 inches, 1.2 inches or about 1.2 inches, 1.4 inches or about 1.4 inches, 1.6 inches or about 1.6 inches, 1.8 inches or about 1.8 inches, 2 inches or about 2 inches, more than 2 inches, or from and to any of these numbers, for example from 0.4 inches to 2 inches or from about 0.4 inches to about 2 inches. In some embodiments, the thickness T can be greater than 2 inches. In some embodiments the thickness T can be the same as a recess depth of the crankcase. In other embodiments, the thickness T can be greater than or less than a recess depth of the crankcase.

In some cases, mounting plates can be made in various sizes in order to allow for different deck heights, cylinder thicknesses, rod lengths, crank strokes, piston diameter sizes, and so forth. For example, a mounting plate can be designed for a particular combination of bore size, stroke size, connecting rod length, and so forth. In some embodiments, deck inserts can be offered as a solid unit (e.g., a blank) that can be machined and/or customized by an end user, by a manufacturer, and so forth. For example, a blank mounting plate can be cut to accommodate particular engine components. Replaceable mounting plates that can be selected for specific components can have several advantages. For example, a common practice is to use shims, spacer plates, etc., when making engine modifications such as adding a longer connecting rod. However, this can undesirably increase engine volume. By using an appropriate mounting plate (which can be, for example, a premade plate or a custom-manufactured plate made from a blank), desired components can be accommodated without compromises such as unnecessarily and undesirably increasing engine volume.

In some embodiments, the sides of the deck insert can be provided with extra material so that an end user can modify the deck insert for a variety of use cases. For example, in some embodiments, a user can fit a large cylinder onto a small case. For example and without limitation, a user could adapt a mounting plate so that a 500 cc or greater cylinder can be fitted to a 250 cc crank case.

In some embodiments, the mounting plate 104 can have vertical side faces or end faces or a portion of the side faces and/or end faces can be vertically oriented. In some embodiments, the mounting plate 104 can have tapered side faces or end faces or a portion of the side faces and/or end faces can be tapered or have a tapered orientation. For example, with reference to FIG. 10, in some embodiments of the mounting plate 104, the side faces and/or end faces can be angled at an angle θ with respect to vertical. In some embodiments, the angle θ can be 5° or about 5°, 10° or about 10°, 15° or about 15°, 20° or about 20°, 25° or about 25°, 30° or about 30°, 35° or about 35°, or from and to any of the foregoing numbers, for example from 5° to 35° or from about 5° to about 35°.

Figure 13A:
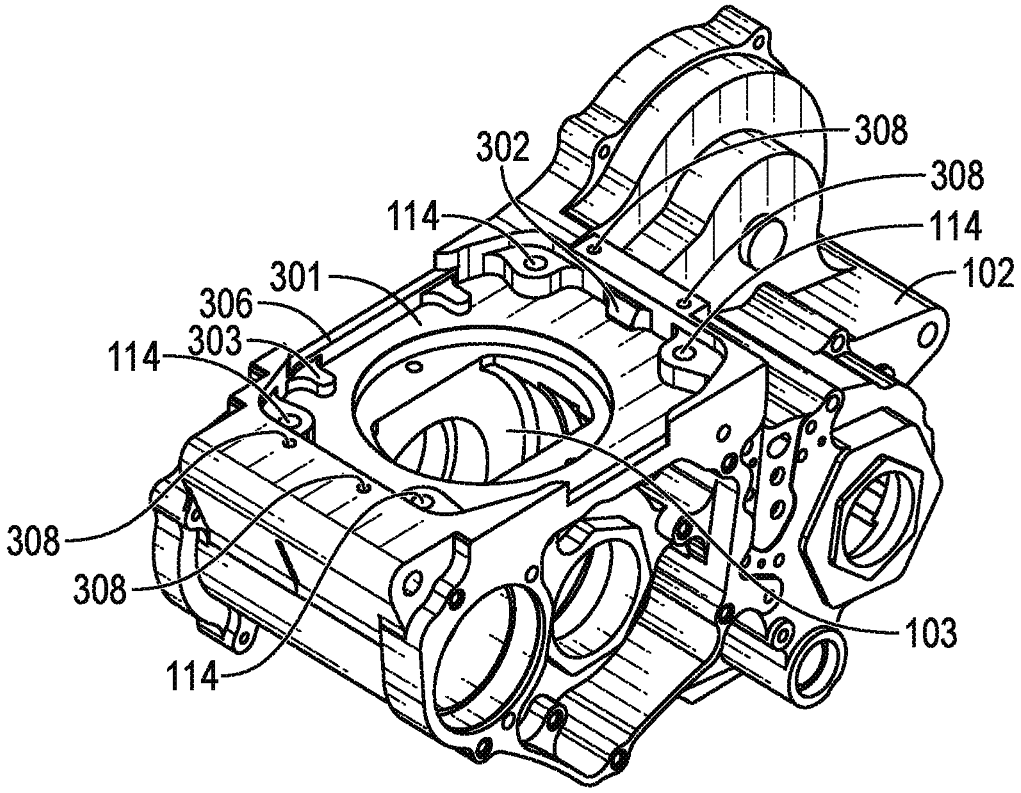
FIGS. 13A and 13B show views of an example embodiment of a crankcase having a pocket for receiving a mounting plate.
Figure 13B:
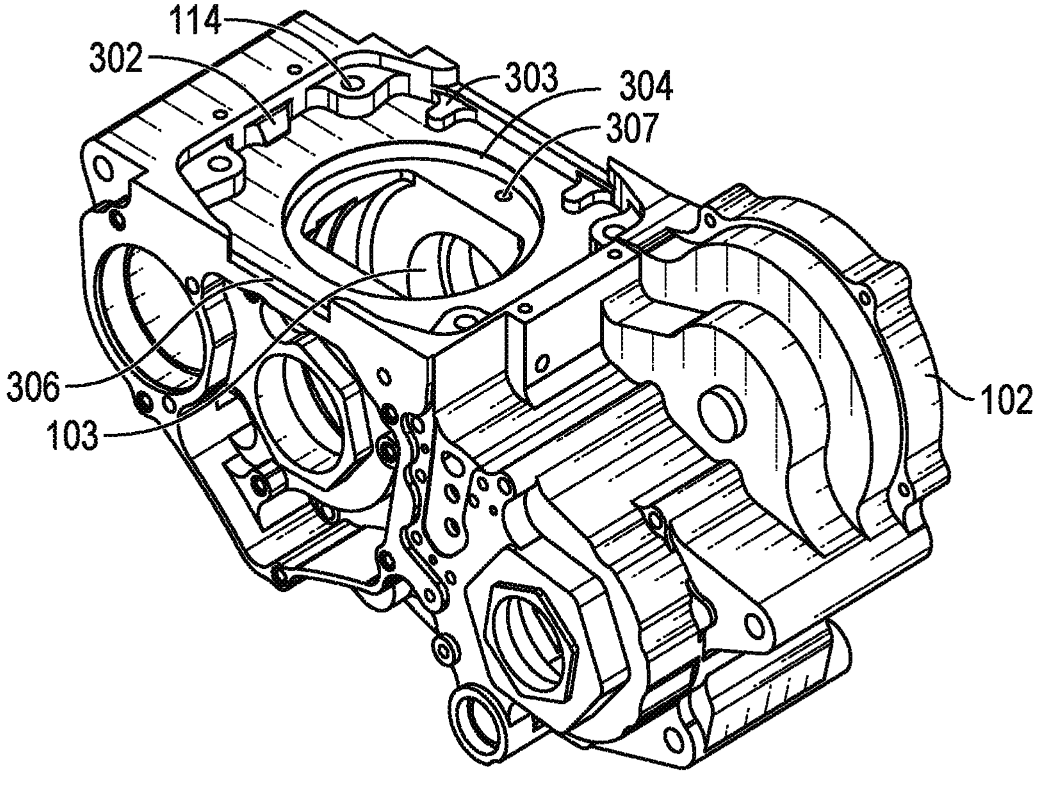

In some embodiments, the first mounting plate 104 can have a first set of mounting holes 110 and a second set of mounting holes 112, wherein the first set of mounting holes 110 of the first mounting plate 104 can be configured to align with a first set of mounting holes 114 of the crankcase (as shown in FIGS. 13A and 13B) and the second set of mounting holes 112 of the first mounting plate 104 can be configured to align with a set of mounting holes of a first cylinder block 106. In this configuration, a set of fasteners (which can be screws or bolts, such as tapered flat head bolts or dual-angled bolts) can be advanced through the first set of mounting holes 110 of the mounting plate 104 and into the first set of mounting holes 114 of the crankcase 102 to couple the mounting plate 104 to the crankcase 102. In some embodiments, the first set of mounting holes 114 of the crankcase 102 can have internal threads. Additionally, a second set of fasteners (which can be screws, bolts, binding barrels, cam studs, and so forth) can be advanced through the second set of mounting holes 112 of the mounting plate 104 and into the set of mounting holes of the cylinder block 106 to couple the cylinder block 106 to the mounting plate 104 and, hence, to the crankcase 102. In some embodiments, the first set of mounting holes 110 and the second set of mounting holes 112 can be untapped. In some embodiments, the first set of mounting holes 110 and the second set of mounting holes 112 can be threaded.

Figure 8A:
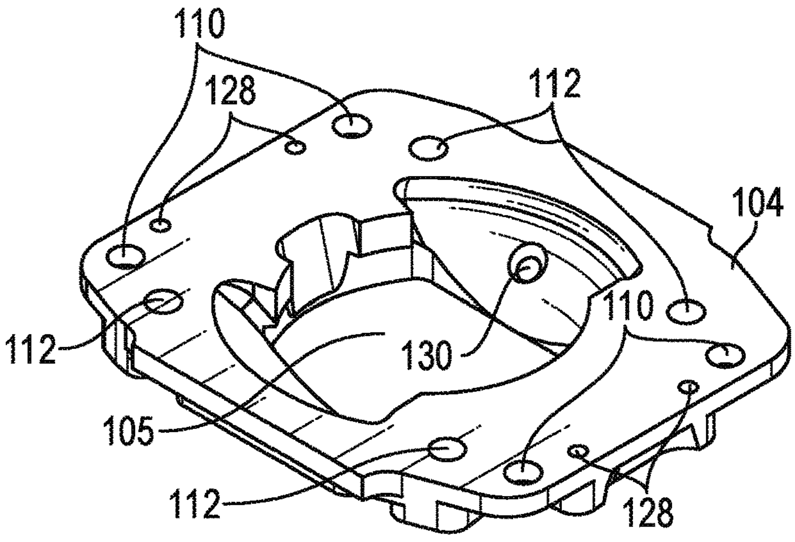
FIGS. 8A, 8B, and 8C show example embodiments of mounting plates.
Figure 8B:
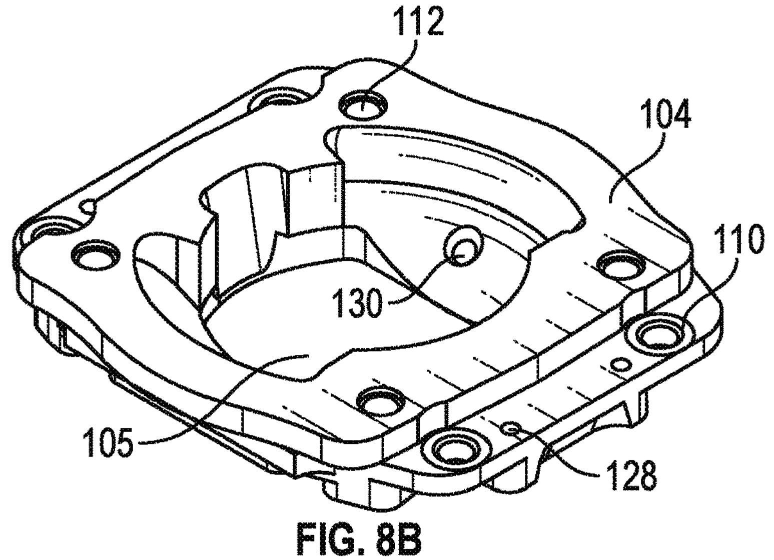
Figure 8C:
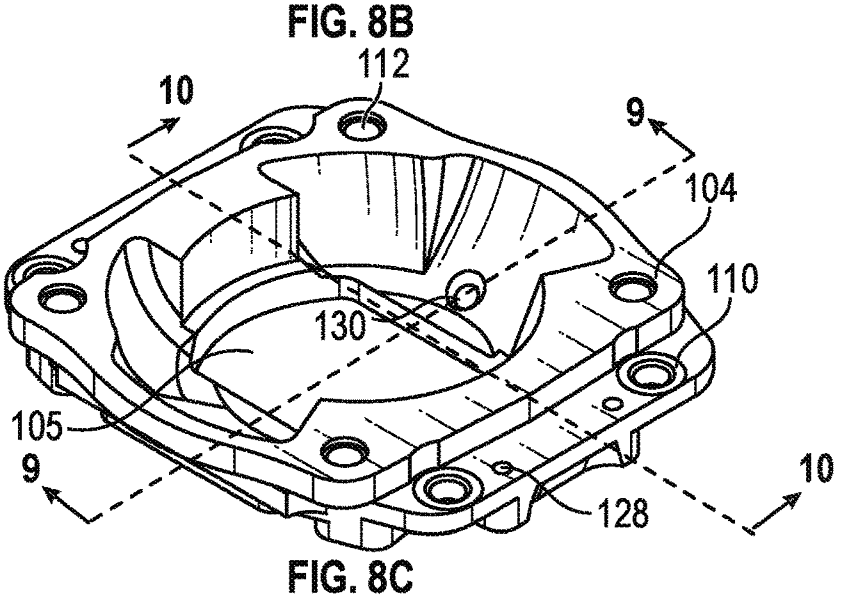

FIGS. 8A-8C show example embodiments of mounting plates. In some embodiments, in addition to the first set of mounting holes 110 and the second set of mounting holes 112, the mounting plate 104 can have a third set of mounting holes 128 and/or oiler holes 130. The third set of mounting holes 128 can be used for attaching the mounting plate 104 to the crankcase 102. In some embodiments, the third set of mounting holes 128 can be tapped. In some embodiments, the mounting plate 104 can be attached to the crankcase 102 using only the first set of mounting holes 110. For example, for smaller engine sizes (e.g., about 360 cc or less), using only the first set of mounting holes 110 can be sufficient. For larger engine sizes, the second set of mounting holes 128 can be used in addition to the first set of mounting holes 110. In some embodiments, girdle straps or plates 208 can be used in conjunction with the third set of mounting holes 128 and corresponding holes 308 in the crankcase 102. The additional anchoring support provided by the girdle straps 208 can be beneficial for larger engine sizes, higher compression, and/or exotic fuel types.

Figure 9:
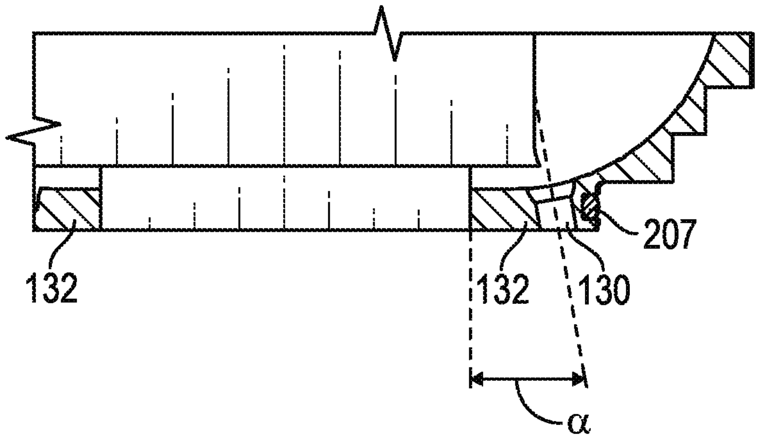
FIG. 9 shows a cross sectional view of the embodiment of the mounting plate having bearing oil holes shown in FIG. 8C, taken through line 9-9 shown in FIG. 8C.

With reference to FIG. 9, some embodiments of a mounting plate can have a relatively large sealing boss and o-ring for coupling with the crankcase 102. The sealing boss 132 and o-ring 207 can also, in some embodiments, aid in aligning the mounting plate 104 and the crankcase 102. In some embodiments, the o-ring 207 and sealing boss 132 can be used as a primary sealing interface between a crank case and a mounting plate. The relatively large sealing boss 132 can add structural support and rigidity, which can be important as the mounting plate 104 can be subject to substantial pressure differentials and forces during the operation of a combustion engine. In some embodiments, the mounting plate 104 may lack a sealing boss and could instead seal against the crankcase 102 using, for example, a flat gasket between the interfaces of the mounting plate 104 and the crankcase 102.

The oil holes 130 can be used for providing lubricant within the crankcase, for example to the crank bearings. The oil holes 130 can be vertically oriented or, as shown in FIG. 9, can be at an angle α from vertical. The angle α can facilitate improved delivery of lubricant as compared to vertical holes and/or can help to avoid the o-ring 207. In some embodiments, α can be, for example, 5° or about 5°, 10° or about 10°, 15° or about 15°, 20° or about 20°, 30° or about 30°, or from and to any of these numbers, for example from 5° to 30° or from about 5° to about 30°.

Figure 11A:
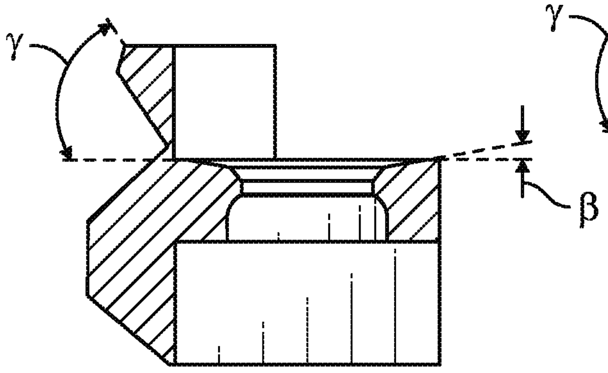
FIG. 11A shows a cross sectional view of an embodiment of a dual-angled mounting hole that can be used with any of the embodiments of the mounting plates disclosed herein.
Figure 11B:
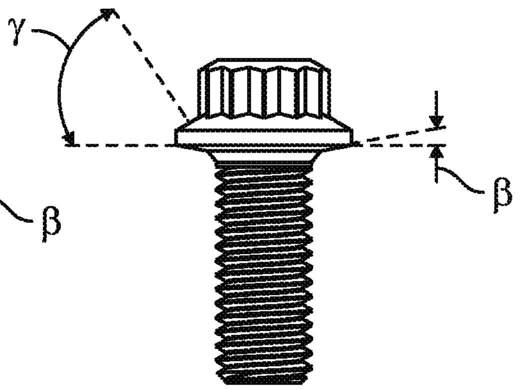
FIG. 11B shows a side view of a dual-angle bolt that can be used with some embodiments of the dual-angle mounting hole of FIG. 11A.

The first set of mounting holes 110 can be shaped with multiple angles at the top end of the hole (i.e., nearest the top surface of the mounting plate 104) as shown in FIG. 11A. For example, in some embodiments, the mounting holes 110 can have a first surface at an angle β with respect to the top surface of the mounting plate 104 and a second surface at an angle γ with respect to the top surface of the mounting plate 104. In some embodiments, β can be smaller than γ. In some embodiments, β can be, for example, 5° or about 5°, 10° or about 10°, 15° or about 15°, 20° or about 20°, or from and to any of these numbers. In some embodiments, γ can be, for example, 30° or about 30°, 40° or about 40°, 50° or about 50°, 60° or about 60°, 70° or about 70°, or from and to any of these numbers. The dual angle bolt holes can help to align the mounting plate 104 with the crankcase 102 when matching dual-angled bolts are used. An example dual-angled bolt is shown in FIG. 11B, wherein the bolt has surfaces at angles corresponding to the angles of the mounting holes 110.

Figure 12A:
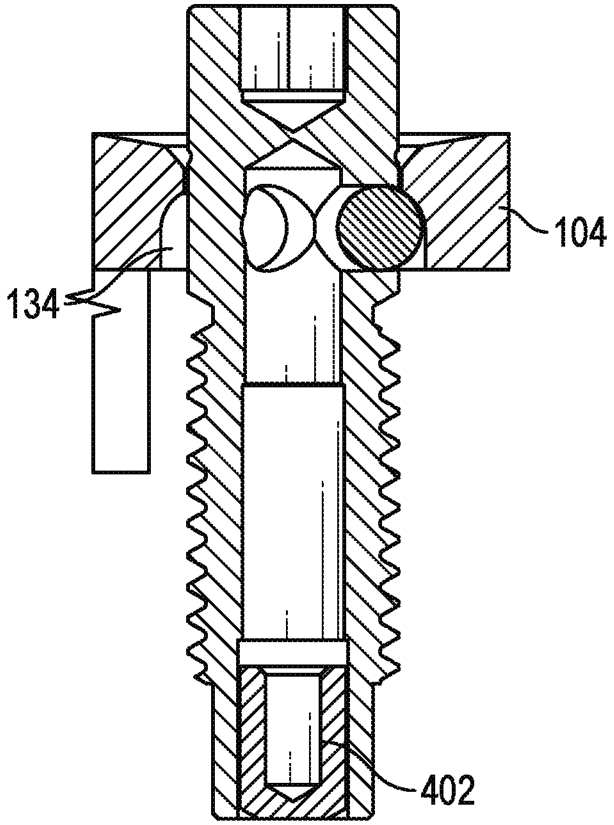
FIG. 12A shows a side view of a locking bolt according to some embodiments.
Figure 12B:
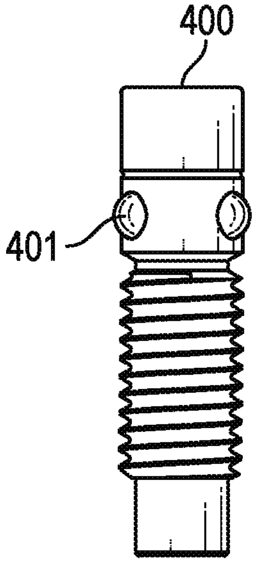
FIG. 12B shows a cross sectional view of an embodiment of a locking bolt and mounting plate in an assembled state.

In some embodiments, as illustrated in FIGS. 12A and 12B, a locking type bolt can be used instead of dual-angled bolts. For example, the mounting holes 110 can have an undercut portion 134 for receiving a bearing, which can help to prevent vertical movement of the mounting plate 104 as well as helping to center the mounting plate 104 with respect to the crankcase 102. A bolt 400 can have an expansion mechanism 402 that causes bearings 401 to move outward form the center of the bolt 400 into the undercut portion 134 of the mounting plate 104.

Any embodiments of the engine assembly 100 can include a second mounting plate in addition to or in place of the first mounting plate. The crankcase can configured to selectively receive the second mounting plate in place of the first mounting plate 104 so that the second mounting plate is coupled with the crankcase 102. The second mounting plate can be different than the first mounting plate 104 in any respect. In any embodiments, the first and/or the second mounting plate, or any desired mounting plate, can be selectively coupleable with and removable from the crankcase 102. The second mounting plate can similarly have an opening therethrough that aligns with the opening 103 of the crankcase 102 when the second mounting plate is coupled with the crankcase 102. In some embodiments, the second mounting plate can be configured to receive a second cylinder block, and can be configured to couple the second cylinder block to the crankcase 102. The second cylinder block can be any desired cylinder block that has a different shape and/or size as compared to the first cylinder block 106.

Figure 3:
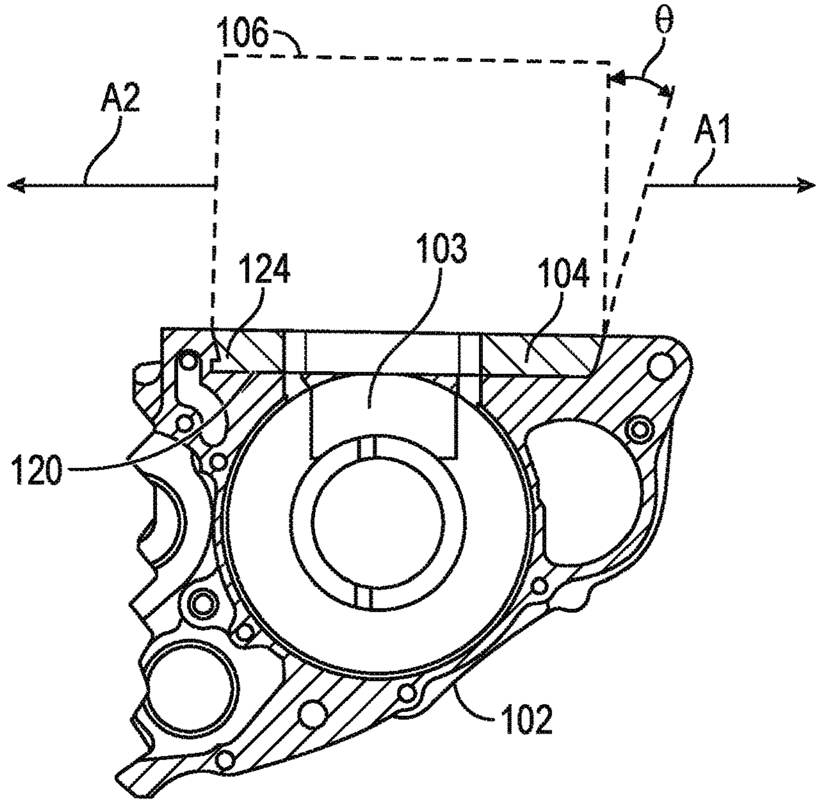
FIG. 3 shows a partial section view of the embodiment of the crankcase of FIG. 1 taken through section 2-2 shown in FIG. 1.
Figure 10:
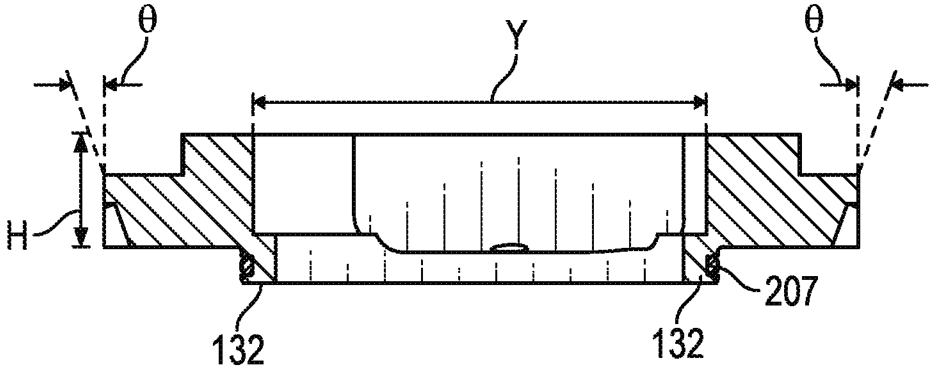
FIG. 10 shows a cross sectional view of the embodiment of the mounting plate shown in FIG. 8C, taken through line 10-10 shown in FIG. 8C.

As shown in FIGS. 3, 4, and 10, in some embodiments, a mounting plate 104 can have one or more sides that are angled or partially angled (e.g., a first portion at a first angle and a second vertical portion, which in some embodiments can transition smoothly or can be joined by a horizontal portion). For example, a mounting plate 104 can have angled sides at an angle θ with respect to vertical. The angle θ of the angled sides can correspond to (e.g., be the same or about the same as) the angle of a tapered wall of a crankcase 102 (for example, the tapered walls or projections 302 shown in FIGS. 13A and 13B). In some embodiments, the entire length of a side of a mounting plate 104 can be tapered, or only a portion can be tapered, for example to correspond to a tapered section of a wall of a pocket 120 of the crankcase 102 (e.g., a tapered locator interlock 302 as shown in FIGS. 13A and 13B). In some embodiments, all sides of the mounting plate 104 can be angled, or three sides can be angled, or two sides can be angled, or one side can be angled, or no sides can be angled. In some embodiments, different sides of the mounting plate 104 can have the same angle. In some embodiments, different sides can have different angles, for example to ensure that the mounting plate 104 can only be inserted into a corresponding crankcase 102 in a limited number of orientations (for example, one orientation or two orientations). In some embodiments, the angle θ can be 5° or about 5°, 10° or about 10°, 15° or about 15°, 20° or about 20°, 25° or about 25°, or from and to any of these numbers, for example from 5° to 25° or from about 5° to about 25°.

Similar to the first mounting plate 104, the second mounting plate can have a first set of mounting holes that are configured to align with the first set of mounting holes 114 of the crankcase 102 to enable the second mounting plate and any other mounting plate to be interchangeably coupled with the crankcase 102. The second mounting plate can also have a second set of mounting holes that are configured to align with the set of mounting holes of the first cylinder block 106 so as to couple the first cylinder block 106 to the crankcase 102 in a second orientation (for example, an orientation wherein an exhaust manifold of the cylinder block faces in the direction designated by arrow A2 shown in FIG. 3), wherein the second orientation is different than the first orientation. In some embodiments, the second orientation (indicated by arrow A2) can be 180° rotated from the first orientation (indicated by arrow A1), as shown in FIG. 3. In any embodiments disclosed herein, the mounting plate can be configured such that the cylinder block can be mounted sideways, i.e., so that the exhaust port is oriented to the side of the crank case.

In some embodiments, the second mounting plate can have a second set of mounting holes that are configured to align with a set of mounting holes of a second cylinder block to couple a second cylinder block to the crankcase 102, wherein the second cylinder block is different than the first cylinder block 106. In any embodiments disclosed herein, the first cylinder block 106, second cylinder block, or any other cylinder block can include a piston.

Figure 5:
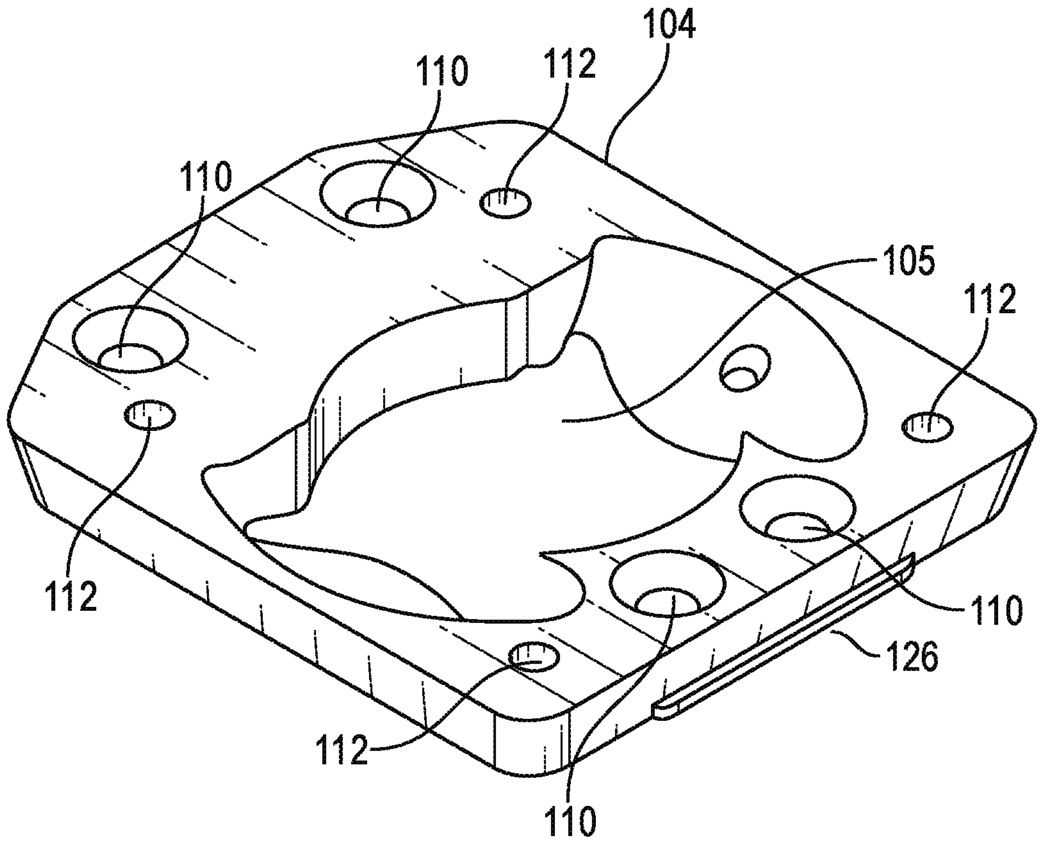
FIG. 5 shows an isometric view of the embodiment of the mounting plate component of the embodiment of the crankcase of FIG. 1.

In some embodiments, with reference to FIG. 3, the crankcase 102 can have a recess 120 adjacent to the opening 103 of the crankcase 102. The recess 120 can be configured to receive the first mounting plate 104 or at least a portion of the first mounting plate 104 therein. Additionally, in any embodiments, the crankcase 102 can have one or more locking or securing features configured to couple with one or more corresponding locking features of the first mounting plate 104. For example, and without limitation, with continued reference to FIG. 3, the crankcase 102 can have an undercut or a groove 124 formed therein, the groove 124 being configured to receive a tongue portion 126 of the first mounting plate 104 (as shown in FIG. 5). In some embodiments, the recess 120 can have a groove 124 and the first mounting plate 104 can have a tongue 126 configured to complement a shape of the groove and to couple with the groove 124 to secure at least a portion of the first mounting plate 104 to the recess 120. Further, in any embodiments disclosed herein, the mounting plate and the crankcase can have matched tapered walls and/or any other desired complementary features or shapes. In other embodiments, the mounting plates and the crankcase can be configured such that the crankcase does not have a recess and, accordingly, such that the mounting plate is not positioned within a recess. For example and without limitation, the crankcase of some embodiments can be configured such that the mounting plate is coupled with an outside or upper surface of the crankcase.

With reference to FIGS. 13A and 13B, the crankcase 102 can have a cutout or pocket for receiving a mounting plate 104. The crankcase 102 can have tapered locator interlocks 302, which can help to align and secure a mounting plate 104 to the crankcase 102. The crankcase 102 can have extending portions 303 that can aid in aligning the crankcase 102 and mounting plate 104. The crankcase 102 can have an o-ring sealing surface 304. The o-ring sealing surface 304 can be configured to receive an o-ring 207 and sealing boss 132 from the mounting plate 104 and to form a substantially leak-proof seal therebetween. The crankcase 102 can have mount plate anchor locations 114 that align with mounting holes 110 of the mounting plate 104 for receiving bolts or other fasteners to secure the mounting plate 104 to the crankcase 102. Some embodiments of the crankcase 102 can have side deck clearances 306 that can enable larger cylinder transfer areas and/or volumes. The crankcase 102 can have one or more oiler holes 307 that can be used to provide lubricant to crank shaft bearings in the crank case and that correspond to the oil holes 130 of the mounting plate 104. In some embodiments, the oiler holes 307 can be vertical or angled, for example at the same angle as the oil holes 130 of the mounting plate 104, or at a different angle.

Figure 14A:
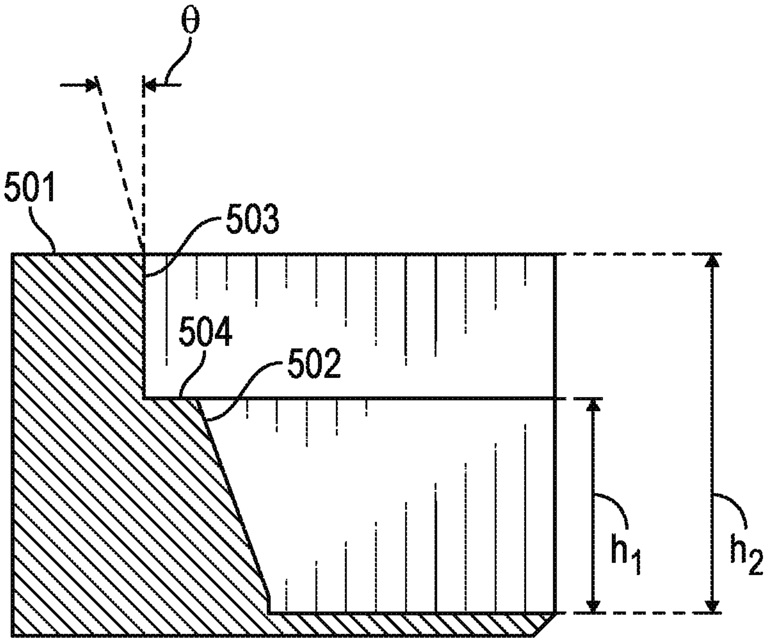
FIGS. 14A and 14B show partial cross sectional views of an embodiment of a crankcase having tapered interlocks.
Figure 14B:
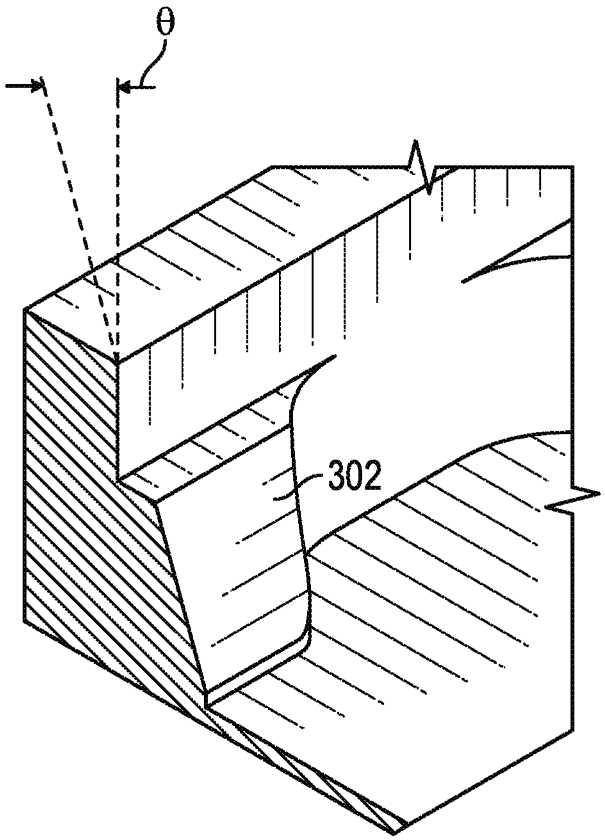

FIGS. 14A and 14B show a detailed view of an embodiment of an interlock 302. As shown in FIG. 14A, a crankcase can have total pocket depth $h_2$ and a taper depth $h_1$. In some embodiments, the taper depth $h_1$ can be the same as the total cutout depth $h_2$ or can be less than the total cutout depth $h_2$. A tapered wall 502 can be at an angle θ with respect to vertical (e.g., in a direction normal to the top surface 501 of the mounting plate 104. In some embodiments, the angle θ can be 5° or about 5°, 10° or about 10°, 15° or about 15°, 20° or about 20°, 25° or about 25°, or from and to any of these numbers, for example from 5° to 25° or from about 5° to about 25°. In some embodiments, the tapered wall 502 can smoothly transition into the vertical wall 503 (e.g., without a horizontal step). In some embodiments, there can be a horizontal step 504 at $h_1$. In some embodiments, the width of the horizontal step 504 can be such that the tapered wall 502 would intersect at the edge of the top surface 501 of the mounting plate 104 if extended, as shown in FIG. 14A. However, this need not be the case as the width of the horizontal step 506 can be smaller or greater. In some embodiments, the angle θ, $h_1$, $h_2$, width of the horizontal step 506, and so forth can correspond to features of the mounting plate 104.

As mentioned above, any embodiments of the crankcase 102 can be configured to receive and couple with any number of different removable mounting plates, including but not limited to a third plate. Accordingly, the crankcase 102 can be configured to selectively receive the third mounting plate in place of the first mounting plate 104 so that the third mounting plate is coupled with the crankcase 102. The third mounting plate can be different than the first mounting plate 104 and the second mounting plate, and/or any other mounting plate, though any of the first mounting plate, the second mounting plate, and any other mounting plate can have common features, including without limitation the mounting holes for attachment to the crankcase 102. Similar to the other mounting plates, the third mounting plate can have an opening therethrough that aligns with the opening of the crankcase 102 when the third mounting plate is operably coupled with the crankcase 102. Hence, the third mounting plate can have a first set of mounting holes that are configured to align with the first set of mounting holes of the crankcase 102. In any embodiments, the third mounting plate can be configured to receive a third cylinder block and to couple the third cylinder block to the crankcase 102, wherein the third cylinder block has a different shape and/or size as compared to the first cylinder block 106 and the second cylinder block. In some embodiments, the second mounting plate or any additional mounting plate disclosed herein can have any desired thickness or height, so as to provide an adjustable deck height and/or an increased clearance height for particular cylinder blocks, to thereby eliminate the need for separate spacer or riser plates and, in some embodiments, to eliminate a need for a separate gasket used with a separate spacer or riser plate.

Figure 15:
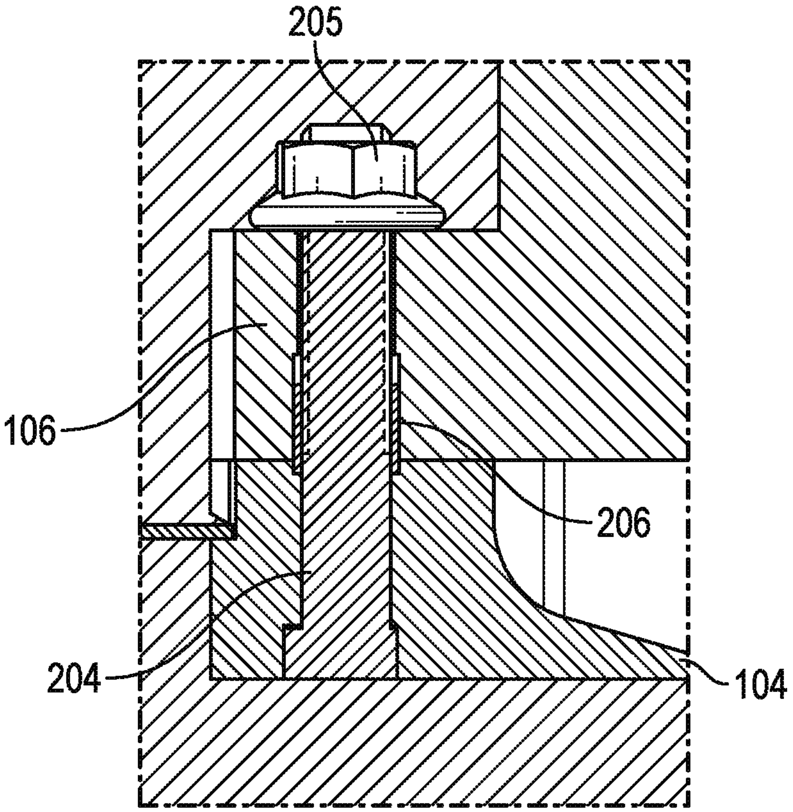
FIG. 15 shows a cross sectional view of an embodiment of a coupled mounting plate and cylinder block.
Figure 16:
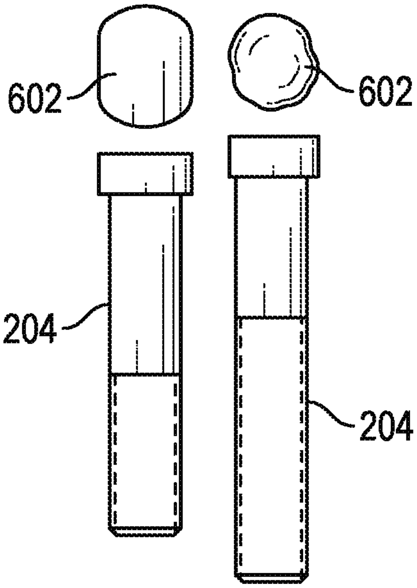
FIG. 16 shows views of embodiments of anti-rotation fasteners.
Figure 17:
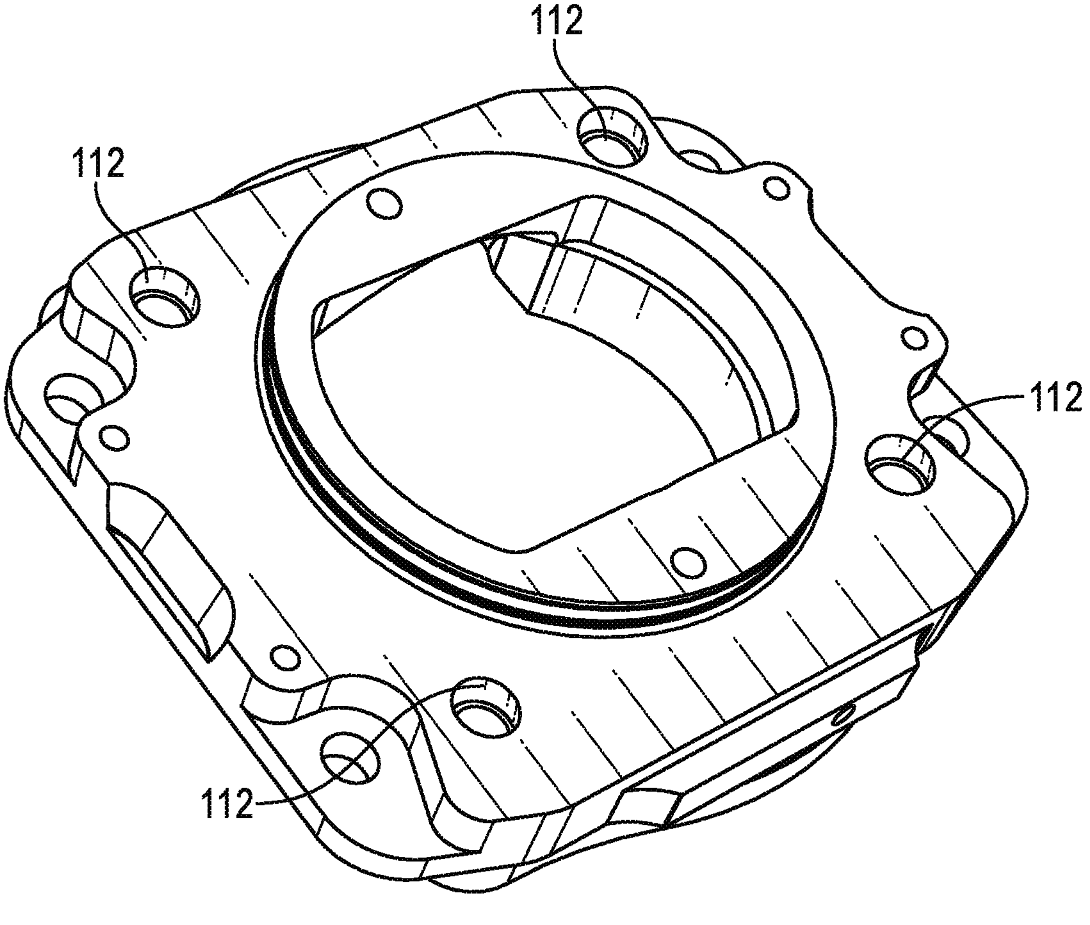
FIG. 17 shows an isometric bottom view of a mounting plate according to some embodiments.

As discussed briefly above, the mounting plate 104 can be configured with mounting holes 112 for attaching a cylinder block 106 to the mounting plate 104. As shown in FIG. 15, hollow dowels 206 can occupy a portion of the mounting holes 112 and the corresponding holes in the cylinder block and can help to align to mounting plate 104 and the cylinder block 106. Fasteners 204 can be fed through the mounting holes 112 and used to attach the mounting plate 104 to the cylinder block 106 and can be secured by the nuts 205. As shown in FIG. 16, the head 602 of an anti-rotation fastener 204 can be oblong, square, rectangular, triangular, hexagonal, star-shaped, or otherwise shaped to prevent turning when torque is applied to the nuts 205. As shown in FIG. 17, which shows a bottom view of a mounting plate 104, the mounting holes 112 can have an oblong or otherwise non-circular portion for receiving the heat 602 of the fastener 204 and preventing substantial rotation of the faster when torque is applied. For example, the non-circular portion can have the same shape (or a similar shape) as the head 602 of the fastener 204.

Note that all references to an engine assembly herein are meant to refer to a complete engine assembly or a sub-assembly of an engine comprising at least the crankcase 102 and a mounting plate. The mounting plate component is also referred to herein as an interchangeable cylinder deck mounting plate, deck plate, or mounting interface component. The crankcase 102 is also referred to herein as a bottom end portion or a bottom end, and the cylinder block portion is also referred to herein as a top end portion or a top end.

ADDITIONAL EMBODIMENTS

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15°, 10°, 5°, 3°, 1°, or 0.1°.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A mounting plate comprising:

an opening therethrough;

a first set of mounting holes extending through the mounting plate;

a second set of mounting holes extending through the mounting plate;

one or more oil holes for transporting oil to the crankcase, the one or more holes different from the opening;

a sealing boss; and a third set of mounting holes extending a distance downward from a top surface of the mounting plate;

wherein:

the mounting plate is configured to couple to a crankcase via the first set of mounting holes;

the mounting plate is configured to couple to a cylinder block via the second set of mounting holes;

the sealing boss is configured to receive an o-ring and to seal against a surface of the crankcase; and the third set of mounting holes is configured to secure a girdle strap.

2. The mounting plate of claim 1, wherein the girdle strap is configured with a plurality of mounting holes for attaching the girdle strap to the mounting plate and to the crankcase.

3. The mounting plate of claim 1, wherein the one or more oil holes are at an angle with respect to an axis that is perpendicular to a bottom surface of the mounting plate, and wherein the angle is from about 5° to about 15°.

4. The mounting plate of claim 1, further comprising at least one angled portion on at least one side of the mounting plate, the at least one angled portion configured to align with an angled portion of the crankcase.

5. The mounting plate of claim 1, wherein the first set of mounting holes comprises:

a first portion adjacent to a top surface of the mounting plate and at a first angle with respect the top surface of the mounting plate; and a second portion adjacent to the first portion and at a second angle with respect to the top surface of the mounting plate.

6. A crankcase comprising:

an opening extending at least through an upper surface thereof, the opening being configured to receive a crank arm therethrough in an operable state; and a recess for receiving a first mounting plate, wherein the recess includes at least one tapered interlock having a tapered segment, the taper extending substantially from a lower surface of the recess toward an upper opening of the recess.

7. The crankcase of claim 6, further comprising a first set of mounting holes, the first set of mounting holes configured for coupling a mounting plate to the crankcase.

8. The crankcase of claim 6, wherein the tapered segment has a first height, wherein the recess has a second height, and wherein the first second is less than the second height.

9. The crankcase of claim 6, wherein the recess further comprises:

a horizontal segment; and a vertical segment.

10. An engine sub-assembly for a gasoline powered engine, comprising:

the crankcase of claim 6; and a first mounting plate configured to be coupled with the crankcase, the first mounting plate having an opening therethrough and comprising one or more oil holes for transporting oil to the crankcase, the one or more oil holes different from the opening;

wherein:

the first mounting plate is selectively removable from the crankcase;

the opening of the first mounting plate generally aligns with the opening in the crankcase when the first mounting plate is coupled with the crankcase in an operable state; and the first mounting plate is configured to receive a first cylinder block and to couple the first cylinder block to the crankcase in at least a first orientation.

11. The engine sub-assembly of claim 10, wherein the first mounting plate has a first set of mounting holes and a second set of mounting holes, wherein the first set of mounting holes of the first mounting plate are configured to align with a set of mounting holes of the crankcase so that a first set of fasteners can advance through the first set of mounting holes of the first mounting plate and the set of mounting holes of the crankcase to couple the first mounting plate to the crankcase and the second set of mounting holes of the first mounting plate are configured to align with a set of mounting holes of a first cylinder block so that a second set of fasteners can advance through the second set of mounting holes of the first mounting plate and the set of mounting holes of the first cylinder block to couple the cylinder block to the first mounting plate.

12. The engine sub-assembly of claim 10, further comprising a second mounting plate that is different than the first mounting plate, wherein:

the crankcase is configured to selectively receive the second mounting plate in place of the first mounting plate so that the second mounting plate is coupled with the crankcase;

the second mounting plate is selectively removable from the crankcase;

the second mounting plate has an opening therethrough that aligns with the opening of the crankcase when the second mounting plate is operably coupled with the crankcase; and the second mounting plate is configured to couple a second cylinder block that is different than the first cylinder block to the crankcase.

13. The engine sub-assembly of claim 12, wherein the second mounting plate is different than the first mounting plate, wherein the second mounting plate is configured to receive a second cylinder block and to couple the second cylinder block to the crankcase, wherein the second cylinder block has a different shape and/or size as compared to the first cylinder block.

14. The engine sub-assembly of claim 12, wherein the second mounting plate is configured to receive a second cylinder block and to couple the second cylinder block to the crankcase, wherein the second cylinder block has a different shape and/or size as compared to the first cylinder block.

15. The engine sub-assembly of claim 12, wherein the second mounting plate has a first set of mounting holes that are configured to align with the first set of mounting holes of the crankcase.

16. The engine sub-assembly of claim 15, wherein the second mounting plate has a second set of mounting holes that are configured to align with the set of mounting holes of the first cylinder block so as to couple the first cylinder block to the crankcase in a second orientation, the second orientation being different than the first orientation.

17. The engine sub-assembly of claim 16, wherein the second mounting plate has a second set of mounting holes that are configured to align with a set of mounting holes of a second cylinder block to couple a second cylinder block to the crankcase, wherein the second cylinder block is different than the first cylinder block.

* * * * *